United States Patent [19]

Takeuchi et al.

[11] Patent Number: 4,697,984
[45] Date of Patent: Oct. 6, 1987

[54] SUPPORTING STRUCTURE FOR UNDERWATER STRUCTURE

[75] Inventors: Mamoru Takeuchi, Hitachi; Sadao Nemoto, Hitachioota; Shizuo Suzuki, Iwaki; Juichiro Kawai, Hitachi, all of Japan

[73] Assignee: Hitachi, Ltd., Tokyo, Japan

[21] Appl. No.: 830,940

[22] Filed: Feb. 19, 1986

[30] Foreign Application Priority Data

Feb. 20, 1985 [JP] Japan .................................. 60-30489

[51] Int. Cl.$^4$ ........................ F01D 15/10; F04D 29/60
[52] U.S. Cl. ................................. 415/142; 415/219 R; 415/135; 290/52; 248/618; 248/DIG. 1
[58] Field of Search ............... 415/134, 135, 136, 137, 415/138, 139, 140, 141, 142, 219 R, 500; 290/52; 405/77, 78; 248/618, DIG. 1, 634

[56] References Cited

U.S. PATENT DOCUMENTS

| 998,709 | 7/1911 | McClave | 415/142 X |
| 2,408,856 | 10/1946 | Hussman | 248/618 |
| 3,939,357 | 2/1976 | Ziegler | 290/52 |
| 4,151,970 | 5/1979 | Bernhard et al. | 415/219 R X |
| 4,190,227 | 2/1980 | Belfield et al. | 248/618 X |

FOREIGN PATENT DOCUMENTS

| 1815471 | 8/1969 | Fed. Rep. of Germany | 415/138 |
| 777380 | 2/1935 | France | 415/219 R |
| 138929 | 10/1979 | Japan | 415/219 R |

OTHER PUBLICATIONS

Water Power & Dam Construction, 6-1978 p. 47.
La Houille Blanche/N May/Jun. 1982, p. 506.

Primary Examiner—Robert E. Garrett
Assistant Examiner—Joseph M. Pitko
Attorney, Agent, or Firm—Fay, Sharpe, Beall, Fagan, Minnich & McKee

[57] ABSTRACT

A supporting structure comprises a shell and a plurality of support members which are independent of each other, inserted in the shell and arranged so that the flexural rigidity is smaller in the water flow than in a perpendecular to the water flow. The supporting structure supports one place of an axial-flow bulb turbine which is to be supported at two places spaced in the water flow direction from each other. The support structure is more flexible in the water flow direction than in the perpendicular direction to the water flow, so that small bending stresses are induced in the support structure and the axial stresses induced in the support structure by the weight and the buoyancy acting on the turbine and the bending stresses induced in the support structure by axial deformation of the turbine are kept below an allowable stress of material constituting the support structure.

11 Claims, 13 Drawing Figures

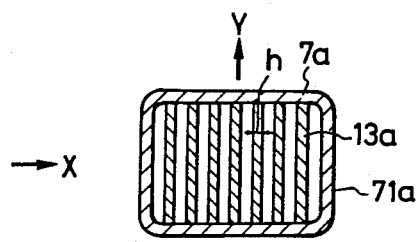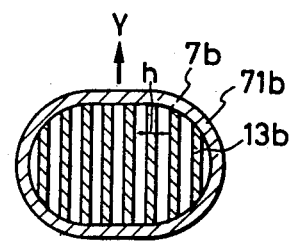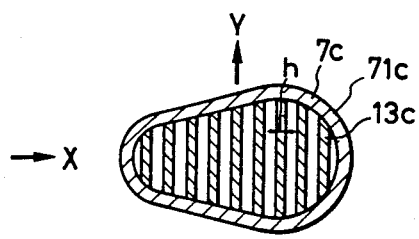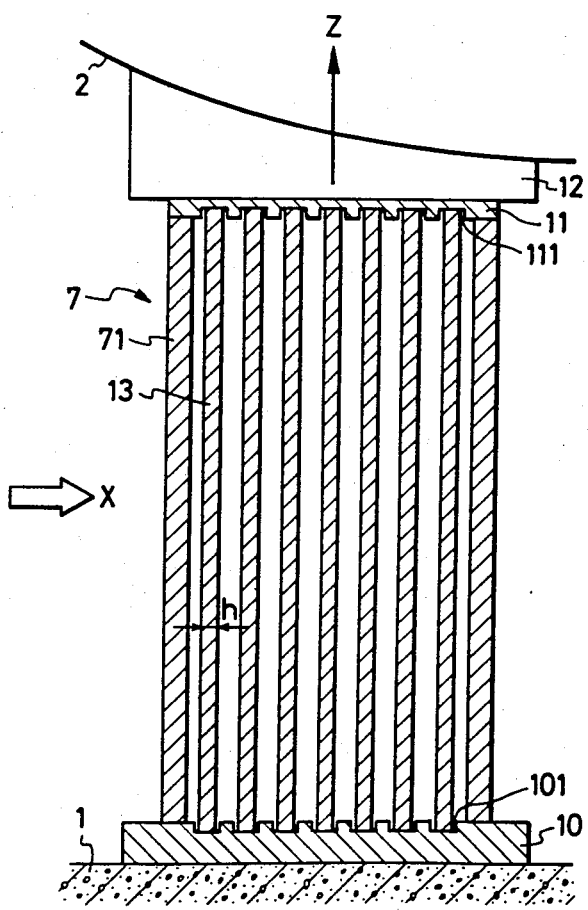

SUPPORTING STRUCTURE FOR UNDERWATER STRUCTURE

BACKGROUND OF THE INVENTION

This invention relates to a supporting structure for an underwater structure, and particularly to a supporting structure suitable for supporting the weight and buoyancy of an underwater structure such as an axial-flow bulb-type turbine disposed in a waterway.

As an example of an underwater structure disposed in parallel to a water flow, there is an axial-flow bulb-type turbine which comprises a bulb body containing therein a generator, etc., and guide vanes and runners each mounted on the bulb body. The axial-flow bulb-type turbine is disposed in water flowing in a waterway surrounded by a concrete construction and is supported by stay vanes and supporting structures such as a bulb body stay, and vibration prevention stays. The stay vanes each extend radially from the bulb body to the concrete construction of the waterway, and one end of each stay vane is fixed to the bulb body and the other end to the concrete construction. The supporting structures are fixed to the bulb body and the concrete construction to support the bulb body at places axially distant from the stay vanes.

The supporting structure generally is classified as a stay type or a pedestal type.

An example of the axial-flow bulb-type turbine employing a stay type supporting structure is disclosed in "Hydroelectric Power Generation" (La Houille Blanche/N 5/6-1982). These type of water turbines have been used in Idaho-Falls Hydropower Plant, Pelton Hydropower Plant, etc. An example of the axial-flow bulb-type turbine employing a pedestal type supporting structure is used in Rock Island Hydropower Plant, which is disclosed in Water Power & Dam Construction 7-1978".

These two types of the supporting structure each have merits and demerits.

In case of the stay type supporting structure, the supporting structure, such as the bulb body stay or the vibro-isolating stay, is constructed so as to restrict an axial deformation of the bulb body due to its thermal expansion in cooperation with the stay vanes, so that the axial deformation induces bending stresses in the supporting structure. As a result, the supporting structure is subjected to axial stresses due to the weight and the buoyancy as well as the bending stresses, whereby the stresses induced in the supporting structure are raised.

The bending stresses increase as the flexural rigidity of the supporting structure increases. On the other hand, when the flexural rigidity is decreased, it is difficult for the supporting structure to have a real cross-section area enough to support the bulb body.

In case of the pedestal type supporting structure, the supporting structure has a sliding face which is slidable in a direction of deformation of the bulb body due to thermal expansion. Therefore, bending stresses induced in the supporting structure by the thermal expansion of the bulb body are much less than in the stay type supporting structure. However, in the pedestal type supporting structure, it is necessary to seal airtightly the sliding face to prevent corrosion and to conduct periodical inspection and maintenance.

SUMMARY OF THE INVENTION

An object of the invention is to provide a stay-type supporting structure for supporting an underwater structure, which supporting structure is sufficiently rigid in the axial direction, and is lower in flexural rigidity in a water flow direction than in the perpendicular direction to the water flow direction.

Another object of the invention is to provide a stay-type supporting structure which has sufficient strength enough to support an underwater structure, and which is easy in manufacturing.

The present invention resides in a stay-type supporting structure for supporting at least one place of an underwater structure which is axially disposed along a water flow and is to be supported at least two places spaced axially from each other, the supporting structure comprising a shell secured both to the underwater structure and to an underwater stationary, and a plurality of elongated members disposed in the shell and arranged so that the elongated members have, as a whole, higher flexural rigidity in a direction perpendicular to the water flow direction than in the water flow direction.

According to an aspect of the invention, the plurality of elongated members support the underwater structure and the underwater stationary through concave and convex engagement formed therebetween.

BRIEF DESCRIPTION OF THE DRAWINGS

FIGS. 3A, 3B and 3C each are a sectional view showing a modification to the supporting structure of FIG. 3;

FIG. 4 is a vertical sectional view of a supporting structure according to another embodiment of the present invention;

DESCRIPTION OF THE PREFERRED EMBODIMENTS

Figure 1:
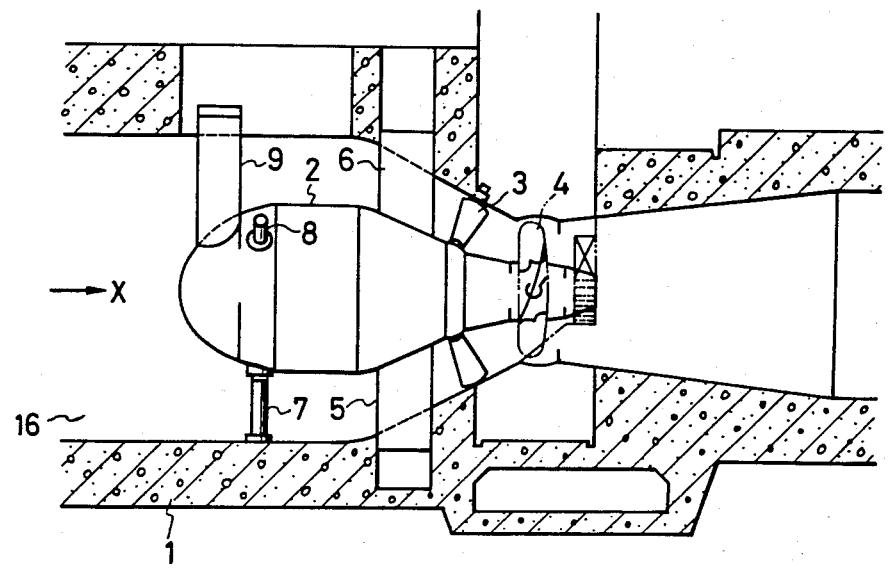
FIG. 1 is a sectional view showing an axial-flow bulb-type turbine, disposed in a flow direction, in which a supporting structure is employed.

Referring to FIG. 1, an axial-flow bulb-type turbine is shown as an example of an underwater structure.

The axial-flow bulb-type turbine is disposed along a water flow guided by a concrete construction, a stationary 1 which surrounds a waterway 16. The turbine comprises a bulb body 2 containing therein a generator, etc., guide vanes 3 and a runner 4, and is supported by stay vanes 5, a hollow stay vane 6, a bulb body stay 7, vibration proof stays 8 and a shaft 9 through which apparatus and devices are checked.

The bulb body stay 7 and the vibration proof stay 8, which are concerned with the present invention and referred to as bulb supports hereunder, are spaced from the stay vanes 5 in the water flow direction, and restrict axial deformation caused by thermal expansion of the bulb body 2 so that bending stresses are induced in the bulb supports 7, 8 as well as axial stresses caused by the weight and the buoyancy of the turbine.

Further, this is explained hereunder in detail.

Supposing that the bulb support 7 is a beam fixed at both ends to the bulb body 2 and the concrete construction 1, and that the upper end of the bulb support 7 is deformed by $\delta$ in the axial direction of the bulb body 2, the maximum bending stress $\sigma_{b\ max}$ is given by the following equation:

$$\sigma_{b\ max} = \frac{M_{max}}{Z} = \frac{6EI\delta}{Z \cdot l^2} \quad (1)$$

wherein
$M_{max}$: the maximum bending moment which is expressed by $$\frac{6EI\delta}{l^2},$$

EI: flexural rigidity of the bulb support 7,
E: Young's modulus,
I: second moment of the area,
Z: section modulus,
l: length of the bulb support 7.

The deformation $\delta$ is given as follows;

$$\delta = \alpha \Delta T L \quad (2)$$

wherein
$\alpha$: linear expansion coefficient,
$\Delta T$: temperature difference (caused, for example, between in the time of setting up and in the time of operation),
L: distance between the bulb support 7 and the stay vane 5.

The bending stress $\sigma_b$ in the bulb support 7 can be found from the equation (1). The stress becomes larger toward the ends of the bulb support 7, and the maximum bending stress $\sigma_b$ max becomes larger, too, as the flexural rigidity EI increases.

If the bulb support 7 is made of only a circular hollow shaft such as conventional one, when the bending stress $\sigma_b$ is made small by reducing the flexural rigidity EI, a sectional area of the hollow shaft which is needed to support the weight and the buoyancy of the bulb body 2 becomes insufficient.

Stresses induced in a fixed portion of the bulb body 2 can be calculated by the equation (1). Axial stresses $\sigma_{a1}$, $\sigma_{a2}$ caused by the weight W1, the buoyancy W2 of the turbine are expressed by the following equations, respectively;

$$\sigma_{a1} = \frac{W_1}{A} \quad (3)$$

$$\sigma_{a2} = \frac{W_2}{A} \quad (4)$$

wherein A is sectional area of the hollow shaft.

Further, the stresses induced in the above-mentioned hollow shaft for supporting the bulb-type turbine are explained using an example of dimensional data.

Supposing that the turbine is used in which the weight and the buoyancy are 500 tons and 150 tons, respectively; the distance L between the stay vane and the hollow shaft and the length l of the hollow shaft are 7 m and 3.5 m, respectively; the temperature difference $\Delta T$ is 50° C.; and material of the hollow shaft is mild steel of Young's modulus E of 21,000 kgf/mm², linear expansion coefficient $\alpha$ of $1.1 \times 10^{-5}/°$ C. and allowable stress $\sigma_a$ of 5 kgf/mm², the sectional area A of the hollow shaft satisfying the equation (3) is given as follows:

$$A = \frac{W_1}{\sigma_{a1}} = \frac{500,000}{5} = 100,000 \ (mm^2)$$

If the hollow shaft has a cross-section of outer diameter of $d_2$, inner diameter of $d_1$ and a ratio $d_1/d_2$ of 0.9, the outer and inner diameters are given as follows:

$$A = \frac{\pi(d_2^2 - d_1^2)}{4} = \frac{\pi(0.19d_2^2)}{4} = 100,000 \ (mm^2)$$

From the above, $d_2$ and $d_1$ are nearly equal to 1,880 mm and 1,690 mm, respectively. An axial deformation $\delta$ due to thermal expansion of the bulb body 2 can be found according to the equation (2);

$$\delta = \alpha \Delta T L = 1.1 \times 10^{-5} \times 50 \times 7000 = 3.85 \ mm.$$

The maximum bending stress $\sigma_{b\ max}$ is as follows:

$$\sigma_{b\ max} = \frac{M_{max}}{Z} = \frac{3Ed_2\delta}{l^2} \approx 37.2 \ kgf/mm^2$$

The value of $\sigma_{b\ max}$ is much larger than the allowable stress of 5 kgf/mm². Therefore, the hollow shaft is not suitable to support the turbine.

Next, an embodiment of the present invention will be described hereunder referring to FIGS. 2 to 4.

Figure 2:
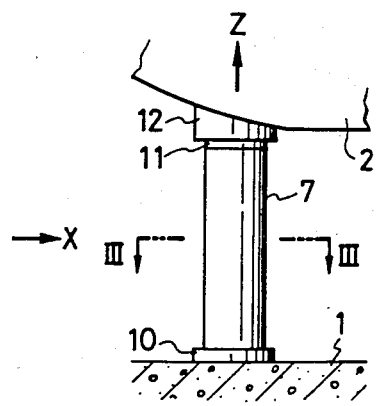
FIG. 2 is a front view of the supporting structure of an embodiment of the present invention.

In FIG. 2, the bulb support 7 for supporting the bulb body 2 is fixed to a base 10 secured to the concrete construction by fastening means such as anchor bolts (not shown) at one end thereof and to a frame or fixing plate 11 secured to a projection of the bulb body 2 by means of welding at the other end. The bulb support 7 comprises a shell 71 and a plurality of thin plates 13 inserted in the shell 71. The shell 71 is a cylindrical hollow shaft and is secured airtightly both to the base 10 and the fixing plate 11 by means of welding. The plurality of thin plates 13 are arranged in parallel to and spaced from each other. Each of the thin plates 13 has a rectangular cross-section, the small dimensional side of which is in a water flow direction (X) and the larger dimensional side in a perpendicular direction (Y) to the water flow direction. Namely, the each thin plate 13 has a thickness (h) and a width (b) and is disposed so that the thickness direction aligns with the water flow direction. The thin plates 13 each are fixed to the fixing plate 11 by welding and to the base 10.

The bulb support 7 comprising the shell 71 and the thin plates 13 is supposed to be a both-ends-fixed beam. The bulb support 7 is larger in flexural rigidity in the Y direction than in the X direction, and supports the bulb-type turbine within the allowable stresses of the axial stress $\sigma_{a1}$ for supporting the weight of the bulb-type turbine, the axial stress $\sigma_{a2}$ for supporting the buoyancy and the maximum bending stress $\sigma_{b\ max}$.

According to this embodiment, the maximum bending stress $\sigma_{b\ max}$ can be kept below the allowable stress by making the flexural rigidity of a X-Z plane smaller than one of a Y-Z plane, without increasing the axial stresses $\sigma_{a1}$, $\sigma_{a2}$.

The cross-sections of the shell 71 and the thin plate 13 along the X-Y plane are determined to proper dimensions so that the axial stresses $\sigma_{a1}$, $\sigma_{a2}$ are kept below the allowable stress $\sigma_b$. Namely, supposing that the maximum bending stress is $\sigma_{b\,max}$, the $\sigma_{b\,max}$ induced in the shell 71 of the bulb support 7 is as follows;

$$\sigma_{b\,max} = \frac{3Ed_2\delta}{l^2} \quad (5)$$

and in the thin plate 13, $$\sigma_{b\,max} = \frac{3Eh\delta}{l^2},$$

wherein h is thickness of the thin plate 13.

Further, the cross-sectional area A expressed in the equations (3), (4) is as follows:

$$A = \frac{\pi}{4}(d_2^2 - d_1^2) + \sum_{i=1}^{n} b_i h_i \quad (7)$$

wherein
- $b_i$: width of the thin plate 13 the length in the Y-direction)
- $h_i$: thickness of the thin plate 13 in the X-direction)
- n : the number of the thin plates 13.

According to the equations (3) to (7), the optimum shape of the bulb support 7 can be determined.

According to this embodiment, the shell 71 can be made of corrosion protective material taking water quality into account and the thin plates 13 can be made of material not treated for corrosion prevention, so that a cost of manufacture can be reduced. Further the maintenance is made free and the life of the bulb support 7 can be elongated, with the stresses being reduced.

In FIGS. 3A to 3C, modifications to the cross-sectional shape of the bulb support 7 are shown.

In FIG. 3A, a bulb support 7a comprises a shell 71a having a rectangular cross-sectional shape and a plurality of thin plates 13a disposed in the shell so as be in parallel to the shorter side thereof. The support 7a is disposed in the water flow so that the plurality of thin plates 13a are perpendicular to the water flow direction indicated by X.

In FIG. 3B, a bulb support 7b comprises an elliptic shell 71b and a plurality of thin plates 13b disposed in the elliptic shell 71b in parallel to the short axis of the elliptic shell 71b. The support 7b is disposed in the water flow so that the large axis of the elliptic shell 71b is in the water flow direction (shown by X).

In FIG. 3C, a bulb support 7C comprises a streamlined shell 71C and a plurality of thin plates 13C. The arrangement of the shell 71C and the thin plates 13C is similar to one of FIG. 3B. The streamlined shell 71C has an advantage that turbulence downstream of the support is prevented and water flow resistance is reduced.

In FIGS. 3A to 3C, (h) indicates thickness of the each plate 13a, 13b, 13c.

Figure 3:
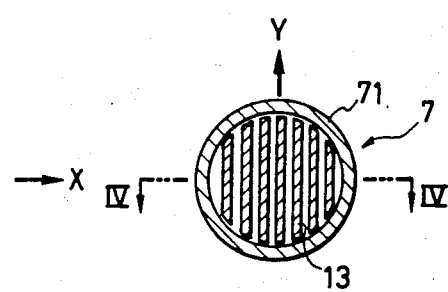
FIG. 3 is a sectional view of the supporting structure taken along a line III—III of FIG. 2.

Another embodiment of connecting means of the bulb support 7 both to bulb body 2 and to the concrete structure 1, is described referring to FIG. 4 wherein the bulb support 7 is the same as illustrated in FIGS. 2 and 3 except for the connection of the thin plates 13 to the bulb body 2 and the concrete structure 1. A fixing plate 11 has a plurality of grooves 111 each of which has a rectangular section in a X-Y plane. The plate 11 is secured to the projection 12 of the bulb body 2. The base 10 also has a plurality of grooves 101 which are the same as ones 111 of the fixing plate 11. The thin plates 13 each are inserted in the grooves 111, 101 at both te ends thereof. Each end 111, 101 has a small amount of play between the side face thereof and the groove 111, 101. In this connecting structure, bending stresses are not induced in the thin plate 13. Therefore, the flexural rigidity of the thin plate 13 is theoretically nearly zero in the X-direction along the water flow, so that the flexural rigidity, in the X-direction, of the bulb support 7 is determined by only the shape and dimensions of the shell 71. The bulb support 7 thus formed has an effect that the flexural rigidity in the X-direction is minimized. Further, the bulb support 7 is reduced in cost because welded portions are few and the assembling operation is easy.

In FIGS. 5A to 5D, examples of grooves formed in a fixing plate 11a, 11b, 11c, 11d in the connecting structure are shown.

Figure 5A:
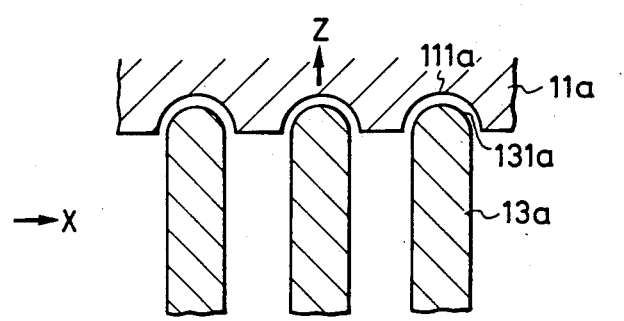
FIGS. 5A to 5D each are a partial sectional view of a construction of engagement between a frame and support members.
Figure 5B:
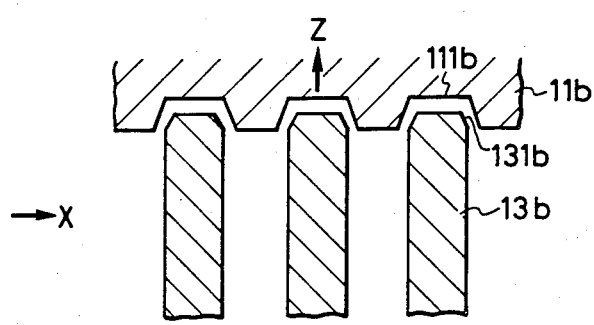
Figure 5C:
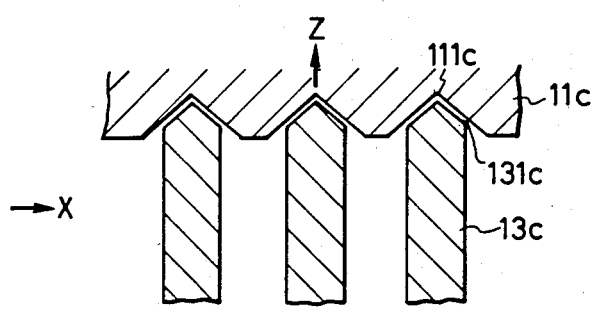

In FIG. 5A, the fixing plate 11a has grooves 111a each of which is semicircular in section in a X-Z plane. Thin plates 13a each of which has a similarly shaped end 131a are inserted in the grooves 111a. FIG. 5B shows the fixing plate 11b which has trapezoid grooves 111b l and thin plates 13b each of which has an end 131b shaped in a trapezoid and inserted in the groove 111b. FIG. 5C shows triangular grooves 111c formed in a fixing plate 11c, and triangular ends 131c of the thin plates 13c which are inserted in the grooves 111c. In the connecting structures shown in FIGS. 5A to 5C, the thin plates are easily inserted into the grooves because the grooves and the ends have inclined surfaces to guide the ends when the ends are inserted in the grooves. Further, all the connecting structures shown in FIGS. 5A to 5C make smaller flexural rigidity in a X-direction along the water flow keeping sufficient rigidity in a Y-direction which is an axial direction of the bulb supports.

Figure 5D:
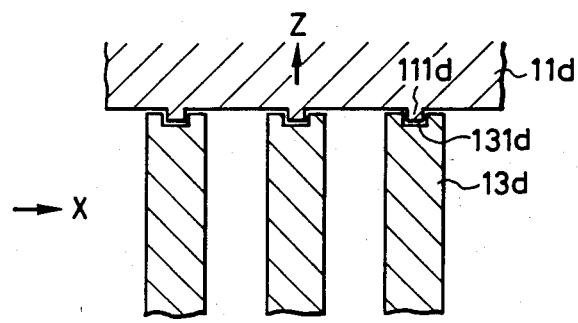

In FIG. 5D, a fixing plate 11d is shown in which projections 111d are formed. A plurality of thin plates 13d each have a groove 131d which receives the projection 111d. The shapes of the projection 111d and the groove 131d can be modified as shown in FIG. 5A to 5C, so that the same effect as in the constructions shown in FIGS. 5A to 5C is brought about.

In FIGS. 5A to 5D, although the connecting structures between the fixing plate 11a to 11d and the thin plates 13a to 13d are shown, connecting structures between the base 10 and the thin plates 13a to 13d can be made in similar constructions.

Figure 6A:
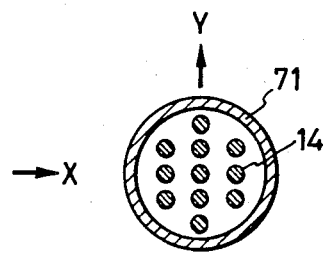
FIGS. 6A and 6B each are a horizontal sectional view showing another embodiment of a supporting structure.
Figure 6B:
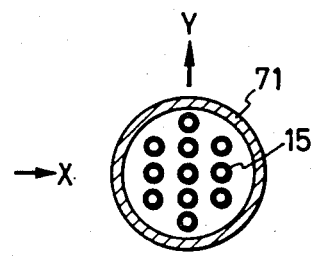

Another embodiment of the present invention is described hereunder referring to FIGS. 6A, 6B.

In FIG. 6A, the bulb support 7 comprises the shell 71 and a plurality of solid rods 14 inserted in the shell 71. The solid rods 14 are arranged such that the number of the rods 14 is less in a X-direction along the water flow than in a Y-direction perpendicular to the X-direction. Thus formed bulb support 7 is more flexible in the X-direction than in the Y-direction.

In FIG. 6B, with the exception that hollow rods 15 are used in place of the solid rod 14 in FIG. 6A, the construction is the same as in FIG. 6A. When cross-sectional areas of the solid and hollow rods are the same as each other, the solid rod is more flexible than the hollow rod and buckling by axial compressive pressive load is more likely to occur in the solid rods 14 than in the hollow rods 15.

In FIGS. 6A, 6B, the rods 14, 15 are circular in cross-section. However, any rods having a cross-section that is symmetric with respect to the axis can be used in place of the rods 14, 15.

What is claimed is:

1. A supporting structure for an underwater structure, disposed in a waterway defined by a stationary and supported at least two places thereof each spaced from each other in a direction of water flow in said waterway, which supporting structure is for supporting at least one of said at least two places and comprises a shell, one end of which is connected to said underwater structure and the other end to said stationary, and a plurality of elongated members, inserted within said shell and formed, as a whole, to be smaller in flexural rigidity in a water flow direction than in a perpendicular direction to the water flow direction, said plurality of elongated members each supporting said underwater structure on said stationary.

2. The supporting structure according to claim 1, wherein each of said plurality of elongated members has a cross-section which is symmetrical with respect to a central axis of said elongated member, and said plurality of elongated members are arranged so as to be less in the number in the water flow direction than in the perpendicular direction to the water flow direction.

3. The supporting structure according to claim 2, wherein said elongated members are cylindrical shafts.

4. The supporting structure according to claim 1, wherein each of said plurality of elongated members has a substantially rectangular cross-section, the longer side of which is in the perpendicular direction to the water flow and the shorter side in the water flow direction, and said plurality of elongated members are arranged in the water flow direction so as to be spaced from each other.

5. The supporting structure according to claim 1, wherein said elongated members are engaged both with said underwater structure and with said stationary through concave and convex connections.

6. A supporting structure for an axial-flow bulb-type turbine, disposed in a waterway defined by a stationary and having a bulb body enclosing therein a generator, a runner mounted on said bulb body to rotate by a water flow in the waterway, and stay vanes supporting, on said stationary, said bulb body at one part thereof in a water flow direction, which supporting structure supporting said bulb body at another part removed from said part in the water flow direction, comprises;

a shell, one end of which is secured to said bulb body and the other end to said stationary defining said waterway, for supporting said bulb body; and a plurality of elongated support members, disposed in said shell, and supporting said bulb body, said plurality of elongated support members being independent of each other and arranged so that said supporting structure is smaller in flexural rigidity in a water flow direction than a perpendicular direction to the water flow direction.

7. The supporting structure according to claim 6, wherein said plurality of elongated support members are axially elongated thin plates arranged in a row in the thickness direction which corresponds to the water flow direction.

8. The supporting structure according to claim 7, further comprisig a plate secured to said bulb body having recesses and a base secured to said stationary having recesses, one end of each of said elongated support members being fitted in one of said plate recesses and the other end in one of said base recesses.

9. The supporting structure according to claim 8, wherein each of said plate recesses have inclined surface portions for guiding said elongated support member.

10. The supporting structure according to claim 7, wherein said shell is a cylindrical hollow shaft.

11. The supporting structure according to claim 7, wherein said shell has a streamlined cross-section, the long axis of which is aligned with the water flow direction.

* * * * *